3,780,004
PROCESS FOR THE ACCELERATED ALCOHOLYSIS OF ETHYLENE-VINYL ESTER INTERPOLYMERS IN THE SOLID PHASE
John M. Hoyt, Karl Koch, and Mathew Williams, Jr., Cincinnati, Ohio, assignors to National Distillers and Chemical Corporation, New York, N.Y.
No Drawing. Filed Sept. 25, 1972, Ser. No. 292,220
Int. Cl. C08f 27/14
U.S. Cl. 260—87.3                              8 Claims

ABSTRACT OF THE DISCLOSURE

Process for the alcoholysis of ethylene-vinyl acetate and other ethylene-vinyl ester interpolymers in the solid phase, wherein the hydrolysis is carried out in a reaction medium comprising a mixture of a low-boiling alcohol, a hydrocarbon solvent, and an aprotic dipolar solvent. Use of a reaction medium incorporating a dipolar aprotic solvent provides markedly increased alcoholysis rates as compared with processes utilizing reaction media absent such constituent. Aprotic dipolar solvents which may be used in the alcoholysis medium include dimethylformamide, dimethylacetamide, dimethyl sulfoxide, tetrahydrothiophene dioxide, N-methylpyrrolidone, hexamethylphosphoric triamide, tetramethylurea, and acetonitrile.

BACKGROUND OF THE INVENTION

This invention relates to a process for the alcoholysis of ethylene-vinyl ester interpolymers, and more particularly to a technique for effecting the alcoholysis of such materials in the solid phase at markedly greater rates than heretofore possible.

The hydrolysis of ethylene-vinyl ester interpolymers by alcoholysis with low-boiling alcohols in hydrocarbon solvent media, and in the presence of acidic or basic catalysts, is well known in the art. Procedures for carrying out this reaction are described, for example, in Roland, U.S. Pat. No. 2,386,347, granted Oct. 9, 1945; Sharkey, U.S. Pat. No. 2,396,210, grandted Mar. 5, 1946; Plambeck, U.S. Pat. No. 2,467,774, granted Apr. 19, 1949; Bryant et al., U.S. Pat. No. 2,668,809, granted Feb. 9, 1954; Bestian et al., U.S. Pat. No. 3,344,129, granted Sept. 26, 1967; and Salyer, U.S. Pat. No. 3,386,978, granted June 4, 1968.

Ethylene-vinyl ester interpolymers have also been hydrolyzed in the solid phase. See, for example, British Pat. No. 1,095,204, 73 Chem. Abstracts 36107m, and 88645e. For example, in the aforesaid British Patent it is disclosed that pellets of an ethylene-vinyl acetate copolymer containing 12.5% vinyl acetate are 95% hydrolyzed upon heating for 50 hours at 85° C. in methanol containing sodium methoxide. The form of the pellets is said to be retained and the rate of the process increased by using a swelling agent such as toluene. Very similar results have been claimed in Bristol, U.S. Pat. No. 3,510,463, granted May 5, 1970, using benzene or methylene chloride as swelling agents. Further, in Worrall, U.S. Pat. No. 3,547,858, granted Dec. 15, 1970, the alcoholysis of vinyl ester copolymers is described in the molten state, for example in an extruder, using a lower primary alcohol in an amount no greater than the weight of the copolymer.

When ethylene-vinyl ester interpolymers are hydrolyzed by alcoholysis in the solid phase as described, for example, in the above cited British Pat. No. 1,095,204 and Bristol, U.S. Pat. No. 3,510,463, the reaction times for substantially complete hydrolysis may range from 2 hours to as much as 50 hours. Much more rapid reaction times are claimed for alcoholysis in the molten state (Worrall, U.S. Pat. No. 3,547,858), reaction times of from a few seconds to a few minutes being cited as typical thereof. However, in the latter case it is clear that the physical form of the ethylene-vinyl ester interpolymer is not retained during the reaction since the alcoholysis is carried out with the polymer in the molten state in a Banbury or other mixer, or in an extruder.

The art also indicates that ethylene-vinyl acetate copolymers, for example, which contain less than 40% vinyl acetate are difficult to hydrolyze because of their poor solubility. Thus Bestian (U.S. Pat. No. 3,344,129) states that such copolymers are hydrolyzed very slowly by alcoholysis in methanol or ethanol because of poor solubility in these solvents. Non-uniform materials are obtained which contain hydrolyzed and unhydrolyzed molecules together in the same reaction product. According to Bestian, the teachin gof Roland in U.S. Pat. No. 2,386,347, relating to the use of mixtures of aromatic hydrocarbons with alcohols as reaction solvents, is only successful in hydrolysis of those ethylene-vinyl ester polymers in which the molar proportion of vinyl ester to ethylene is greater than 1:5, e.g., in the case of ethylene-vinyl acetate copolymers those which contain more than 38% vinyl acetate by weight. When such polymers have low contents of vinyl acetate Bestian claims that the amount of aromatic hydrocarbons required is very high, which is economically disadvantageous, and that the reaction rate is so slow as to be negligible. To overcome these deficiencies, Bestian suggests the use of higher, 4 to 8 carbon alcohols as reaction solvents, and the use of higher reaction temperatures at which improved solubilities may be obtained.

In Imai et al., U.S. Pat. No. 3,080,350, the dipolar aprotic solvent dimethyl sulfoxide is used as a solvent for the polymerization of vinyl acetate and the subsequent hydrolysis or alcoholysis of the resulting poly(vinyl acetate) to poly(vinyl alcohol). The hydrolysis reaction is carried out in solution, the separation of a solid phase (gelation) being avoided (column 3, lines 54–69). Poly(vinyl alcohol) of improved properties is said to be thus prepared but nothing is said regarding acceleration of the rate of the hydrolysis or alcoholysis. In fact, in claim 1 of the patent it is disclosed that the dimethyl sulfoxide is an "inert reaction medium."

The use of dimethyl sulfoxide as a solvent has also been shown to increase the rate of saponification of vinyl acetate-acrylic ester copolymers (Vinson, J. Chem. Ed., 46, 877 (1969). It is clear, however, that the Vinson saponification takes place in the presence of considerable amounts of water, a condition which could not be utilized in the alcoholysis of ethylene-vinyl ester interpolymers.

It is among the objects of the present invention to provide an improved process for preparing hydrolyzed ethylene-vinyl ester interpolymers by solid phase alcoholysis, in accordance with which markedly increased alcoholysis rates are obtained. Other objects and advantages of the process of the present invention will be apparent from consideration of the following detailed description of various preferred embodiments thereof.

SUMMARY OF THE INVENTION

In accordance with the present invention the rate of alcoholysis of ethylene-vinyl ester interpolymers in the solid phase is markedly accelerated by carrying out the alcoholysis in a reaction medium incorporating an aprotic dipolar solvent in addition to the low-boiling alcohol, alkaline or acidic catalyst and, preferably, hydrocarbon solvent, previously utilized in such media. By carrying ou the reaction in the novel accelerated alcoholysis medium hereof the ethylene-vinyl ester interpolymer may be hydrolyzed at greatly increased rates in any convenient solid form, e.g., as sheeting, film, strands, or fibers, e.g., in an in-line operation. In such an operation the interpolymer may be passed through the accelerated alcoholysis bath, into a suitable wash medium (water or alcohol) wherein adhering or absorbed alcoholysis medium is removed, and finally through an appropriate drying zone, prior to being deposited on wind-up rolls as hydrolyzed ethylene-vinyl ester interpolymer film, sheeting, strands, fibers, or the like.

Generally speaking, the effect of hydrolysis on ethylene-vinyl ester interpolymers is to increase their hardness, and to eliminate sticking or blocking. In this way a relatively weak, blocky ethylene-vinyl ester sheet can be transformed into a tough, hard, non-blocking sheet. It is also possible to hydrolyze ethylene-vinyl ester interpolymers, e.g., ethylene-vinyl acetate copolymer sheeting, film, strands, or fibers, to produce partially hydrolyzed objects in which the outer layers are hydrolyzed to a greater degree than the inner layers. In this way it is possible to make laminated or "sandwich" film and sheeting in which the two outer layers are relatively fully hydrolyzed and the inner layer is less fully hydrolyzed. The noted techniques may be carried out at useful rates in in-line operations, employing the accelerating alcoholysis media utilized in the novel process hereof.

The dipolar aprotic solvents useful herein are those solvents having dielectric constants >15 and which, although they may contain hydrogen atoms, cannot donate suitably labile hydrogen atoms to form strong hydrogen bonds with appropriate species [A. J. Parker, Quart. Rev. (London), 16, No. 2, 163 (1962)]. Exemplary of these solvents are dimethylformamide, dimethylacetamide, dimethyl sulfoxide, tetrahydrothiophene dioxide, N-methylpyrrolidone, hexamethylphosphoric triamide, tetramethylurea, and acetonitrile. Other materials of similar structures may also be utilized as the dipolar aprotic solvents hereof. Thus, other sulfoxides which are liquid at or near room temperature may be so employed, e.g., those having the formula

wherein R and $R_1$ may each comprise alkyl groups of from 1 to 4 carbon atoms. Similarly, other sulfones may be so used, e.g., those of the formula

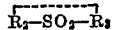

wherein $R_2$ and $R_3$ may be lower alkyl (1 to 4 carbon atoms) or may be linked to form a tetrahydrothiophene ring. Examples of these additional aprotic solvents useful in the process of the present invention are sulfoxides such as diethyl sulfoxide, di-n-propyl sulfoxide and di-n-butyl sulfoxide; linear sulfones such as diethyl sulfone, di-n-propyl sulfone and di-n-butyl sulfone; and heterocyclic sulfones such as 3 - methyltetrahydrothiophene 1,1-dioxide.

It is known in the scientific literature that dipolar aprotic solvents enhance the rates of many nucleophilic reactions (see the above-noted paper in Quart. Rev.) In the chemistry of lower molecular weight organic compounds it has been observed, for example, that the rate of saponification of esters in aqueous dimethyl sulfoxide solution is accelerated as the relative proportion of dimethyl sulfoxide is increased. It appears that the actual nucleophile of these reactions ($OH^-$ in the case of saponification) is strongly hydrogen-bonded in hydroxylic solvents and in this way loses much of its activity. Dipolar aprotic solvents, however, are believed to form strong hydrogen bonds with hydroxylic solvents themselves and, when present in large proportions, to free the bare, highly-reactive nucleophile by competing for the hydroxylic solvent. The accelerated alcoholysis obtained in accordance with the present invention may be attributable to this postulated reaction mechanism. It should, however, be understood that the process hereof is not restricted to the proposed mechanism suggested herein.

PREFERRED EMBODIMENTS OF THE INVENTION

The ethylene-vinyl ester interpolymers which may be alcoholyzed by the process of this invention are normally solid at room temperature. Preferably, such polymers comprise copolymers of ethylene and a vinyl ester such, for example, as vinyl formate, vinyl acetate, vinyl trimethylacetate, vinyl propionate, vinyl butyrate, vinyl trifluoroacetate, or the like. Small amounts of a third monomer may, however, also be contained in the polymer as, for example, a second vinyl ester, carbon monoxide, methyl acrylate, n-butyl acrylate, di-n-butyl maleate, diethyl itaconate, acrylic acid, methacrylic acid, fumaric acid and the like. The invention is principally described and illustrated herein in connection with the alcoholysis of ethylene-vinyl acetate copolymers. While the reaction of such materials is preferred it is intended and it should, however, be understood that the process is similarly applicable to the alcoholysis of other ethylene-vinyl ester interpolymers as defined hereinabove.

Generally, the materials reacted are copolymers containing about 1 to 25 mole percent of the vinyl ester or, for example, from about 3 to 50 weight percent of the ester in the case of the alcoholysis of ethylene-vinyl acetate copolymers. Preferably, copolymers containing about 3 to 18 mole percent of the vinyl ester, about 8 to 40 weight percent when the ester is vinyl acetate, are alcoholyzed. When a third monomer is present, it may comprise up to about 5 weight percent of the total polymer, the remainder of the composition being constituted of the ethylene and vinyl ester units in the relative proportions indicated hereinabove.

The ethylene-vinyl acetate copolymers or other interpolymers which may be hydrolyzed by the present process may be reacted in any convenient solid form; the form of the polymeric material does not significantly change during the alcoholysis reaction, the hydrolyzed product having substantially the same shape and form as the original interpolymer. While, as noted hereinabove, the ethylene-vinyl acetate or other polymer is preferably alcoholyzed in the form of film, sheeting, strands and fibers the present process is not limited to the alcoholysis thereof. Thus the process may also be utilized in connection with the treatment of polymers in powder or pellet form, or in the alcoholysis of molded articles, composite assemblies, foams, or the like.

Whatever their form, the ethylene-vinyl acetate or like polymers alcoholyzed have melt flow rates determined by ASTM Method D 1238–65T varying from about 0.15 g./10 min., as determined by Condition E, to about 25 g./10 min. as determined by Condition A. The preferred copolymers utilized have a melt flow rate of from about 0.15 to 300 g./10 min. in accordance with the noted Condition E., Procedure B.

When the polymer is alcoholyzed in the form of sheeting or film materials ranging in thickness from as little as about 0.1 mil to as much as about 0.5 inch, preferably from about 1 mil to 50 mils, may be treated. When alcoholyzed in the form of fibers or strands it is convenient to react materials having diameters of from about 0.01 mm. to about 10 mm., fibers and strands having diameters of from about 0.1 to 5 mm. preferably being used in the alcoholysis. When used in pulverulent form powders such as those provided in accordance with U.S. Patents Nos. 3,418,269 and 3,422,049, comprising spherical particles having diameters substantially below 25 microns, may suitably be reacted. However, coarse powders having particle sizes in the range of from about 0.025 to 1 mm. may also be employed, and the particles may be irregular in shape as well as spherical. The polymers may also be hydrolyzed in the pellet forms in which resins are commonly commercially supplied. In this instance, pellets which are cubical to ovoid in shape and whose largest dimension may range from about 0.5 to 30 mm., preferably about 2–5 mm., may be alcoholyzed in accordance herewith.

The reaction medium whose use facilitates markedly increased alcoholysis reaction rates in the practice of the present process includes (1) the noted dipolar aprotic solvent, (2) a low-boiling alcohol and, preferably, (3) a liquid hydrocarbon solvent. The use of a two-component alcoholysis medium comprising the dipolar aprotic solvent, which has been found to be responsible for the accelerated alcoholysis rates hereof, and the low-boiling alcohol, is within the purview of the present invention; on the other hand, reaction media incorporating the three components specified provide maximum alcoholysis rates and are, therefore, preferably utilized.

The low-boiling alcohol, which is the reactive component of the liquid alcoholysis reaction medium, may be any monohydric alcohol having up to 4 carbon atoms, i.e., methanol, ethanol, n-propanol, i-propanol, n-butanol, s-butanol, i-butanol, or t-butanol. Primary alcohols are preferred.

The hydrocarbon solvent (which acts as a swelling solvent in the reaction medium) may be a linear paraffin such as ethane, propane, n-butane, n-pentane, n-hexane, n-heptane, n-octane, n-decane, etc.; a brached paraffin hydrocarbon, for example, 2,2-dimethylbutane, 2,2,4-trimethylpentane, or 2,5-dimethyl-hexane; a cycloaliphatic hydrocarbon such as methylcyclopentane, cyclohexane, cyclooctane, or decahydronaphthalene; or an aromatic hydrocarbon such as benzene, toluene, xylene-isomer mixtures or the individual isomers thereof, ethylbenzene, cumene, pseudocumene, cymene, diisopropylbenzene, etc. Aromatic hydrocarbons are preferred.

As recognized in the art, any of a variety of alkaline or acidic materials may be utilized as catalysts for the alcoholysis reaction. The preferred catalyst is an alkali metal or alkaline earth metal alkoxide of the low-boiling alcohol incorporated in the reaction medium, e.g., lithium methoxide, sodium methoxide, sodium ethoxide, potassium isopropoxide, potassium t-butoxide, magnesium ethoxide, etc. Alternative catalysts comprise the hydroxides of the alkali metal and alkaline earth metals, such as lithium hydroxide, sodium hydroxide, potassium hydroxide, magnesium hydroxide and calcium hydroxide.

The proportion of the ethylene-vinyl ester interpolymer alcoholyzed in the reaction medium varies from as much as about 10:1 to as little as about 1:1,000 parts by weight of the polymer: parts by weight of the entire medium, ratios of from about 1:1 to 1:100 being preferred. The volumetric ratio of the interpolymer to the dipolar aprotic solvent in the alcoholysis medium varies from as little as about 1:1000 to as much as about 100:1, preferably from about 1:835 to 30:1. The dipolar aprotic solvent may suitably be incorporated in the medium in volumetric ratios of from 100:1 to 1:10, preferably from about 5:1 to 1:2, based upon the volumes of the hydrocarbon solvent present, the volumetric ratio of both such solvents to the low-boiling alcohol generally ranging from about 100:1 to 1:4, preferably from about 50:1 to 5:1.

The low-boiling alcohol, in the presence of the basic catalyst, effects alcoholysis of the vinyl ester repeating units in the interpolymer, reacting with the same to form vinyl alcohol repeating units in the polymer and the by-product acetate ester of the low-boiling alcohol. The low-boiling alcohol is present in the reaction medium in an amount at least stoichiometrically equivalent to the number of moles of the vinyl ester repeating units to be alcoholyzed.

The process is carried out at a temperature high enough to favor maximum alcoholysis rates but low enough to prevent substantial dissolution, coalescence, sticking, or agglomeration of the solid forms of the ethylene-vinyl acetate or other vinyl ester polymer being alcoholyzed, in order that the hydrolyzed product is in substantially the same form as the original ethylene-vinyl ester starting material. Temperatures of from about 0° to 150° C., preferably from about 30° to 100° C., may be utilized. The reaction may be carried out at atmospheric pressure, or alternatively, under applied pressures of up to about 5,000 p.s.i. It is sufficient if the ambient pressure is adequate to maintain the reaction medium in the liquid state at the particular reaction temperature chosen. Reaction times may also be broadly varied; thus, the alcoholysis may be carried out for periods of from about 1 second to 2 hours, preferably from about 15 seconds to 15 minutes.

The ethylene-vinyl ester interpolymer is introduced into the alcoholysis medium with the temperature, pressure and reaction times regulated as aforesaid. The medium is desirably maintained substantially free of water and the reaction is carried out under a dry, preferably inert atmosphere. To maintain this condition the respective reactants and solvents are dried prior to introduction into the reaction mixture by passage through a suitable solid desiccant such, for example, as an activated molecular sieve, or an activated alumina, or silica gel. The drying is conducted under anhydrous conditions, i.e., under a protective atmosphere of a dry, inert gas such as dry nitrogen, argon or helium.

When the alcoholysis is completed the hydrolyzed ethylenevinyl acetate or similar polymer product is removed from the alcoholysis medium. Adhering or absorbed solvents and catalyst residues are conveniently removed by washing with low-boiling alcohol, preferably containing sufficient weak acid to destroy the catalyst. Alternatively or subsequently, further washing can be accomplished with water, and the hydrolyzed product is then dried.

The alcoholysis accelerating medium may be re-used after the alcoholysis reaction is ended until its activity is substantially exhausted, at which time it is subjected to suitable processes for solvent recovery and recycle.

Alternatively, the reaction may be carried out and the products recovered employing other procedures utilized in the art, for example, the procedure more fully described in co-pending application Ser. No. 286,788, filed Sept. 6, 1972, and entitled, "Process for the Controlled Alcoholysis of Ethylene-Vinyl Ester Interpolymers."

The following examples further illustrate preferred forms of the alcoholysis process of the present invention. Unless otherwise indicated all parts and percentages appearing in the examples or in the preceding description are given by weight and all temperatures are in degrees centigrade.

EXAMPLE 1

This example demonstrates that the rate of alcoholysis of ethylene-vinyl acetate copolymer film is significantly higher in a liquid reaction medium comprising dimethylformamide, toluene and methanol than in other alcoholysis media such as methanol alone or a combination of methanol and toluene.

The alcoholysis reactions were carried out in a 50-ml. glass test tube reactor which was stirred mechanically and provided with an inert atmosphere ($N_2$). The reactor was heated in a constant temperature bath at 50±0.2° C. Toluene and dimethylformamide solvents were dried by passage through activated Linde Molecular Sieves (4A). A stock solution of sodium methoxide was prepared by dissolving the calculated amount of freshly-cut metallic sodium in anhydrous methanol under nitrogen. Liquids and solutions were handled with hypodermic syringes. Several pieces of film were used in each alcoholysis reaction and individual pieces were removed at various time intervals, washed with methanol, dried in vacuum, and analyzed for residual vinyl acetate content by infrared spectroscopy.

In this example an ethylene-vinyl acetate copolymer containing 27.7% vinyl acetate by saponification and having a melt flow rate of 3.3 g./10 min. was compression molded at 150° C. to form film of 2±0.5 mils thickness. The film was then alcoholyzed as aforesaid, the specific parameters of the alcoholysis in the various alcoholysis media being described in Table 1:

TABLE 1.—ALCOHOLYSIS OF 2 MIL ETHYLENE-VINYL ACETATE FILM

[Temperature: 50° C. sodium methoxide catalyst, 0.48 mM.]

| Experiment No. | Alcoholysis medium, ml. of— | | | Reaction time, min. | Residual vinyl acetate, percent |
|---|---|---|---|---|---|
| | Toluene | Dimethylformamide | Methanol | | |
| 1 | 0 | 0 | 12.7 | 15–60 | 26.5–26.6 |
| 2 | 6.35 | 0 | 5.70 | 15–60 | 23.3–24.2 |
| 3 | 6.35 | 5.0 | 0.59 | 15–60 | 2.3±0.4–1.4±0.7 |

Comparison of Experiments 1, 2 and 3 shows that the alcoholysis in the toluene-dimethylformamide-methanol medium is faster than in the toluene-methanol, or pure methanol media. Further experimentation indicates that media containing greater quantities of toluene than that used in Experiment 2 cause agglomeration and eventually dissolution of the film specimens, so that such media cannot be used for direct film hydrolysis.

EXAMPLE 2

This example indicates the effect of methanol and sodium methoxide concentrations and reaction temperature on solid phase alcoholysis in the toluene-dimethylformamide-methanol medium. In this example 20 mil sheeting was used which had been prepared from an ethylene-vinyl acetate copolymer containing about 25 weight percent vinyl acetate and having a melt flow rate of 2–3 g./10 min. Portions of the sheeting were subjected to alcoholysis as described in Example 1 and analyzed by infrared spectroscopy, at intervals, to follow the progress of the reaction. Experimental data are shown in Table 2:

be used, it is evident from Experiments 2–7 to 2–9 that increasing the sodium methoxide concentration leads to increased rates of alcoholysis, but that the effect levels off. Increasing the alcoholysis temperatures to 60° C. does not significantly affect the results.

EXAMPLE 3

This example illustrates the accelerating effect of tetrahydrothiophene-1,1-dioxide on the solid phase hydrolysis of a pelleted ethylene-vinyl acetate copolymer containing about 25% vinyl acetate. The experiments included in this example were all conducted in a glass reaction vessel capable of withstanding moderate pressures. Purified and dried tetrahydrothiophene dioxide and toluene were used. The sodium methoxide catalyst was made by dissolving sodium metal in anhydrous methanol. Solvents and solutions are handled with hypodermic syringes and all operations were carried out under the nitrogen atmosphere. The experiments are summarized in Table 3.

TABLE 3

Acceleration of Rate of Solid-Phase Alcoholysis of Ethylene/Vinyl Acetate Copolymer Pellets by Tetrahydrothiophene-1,1-dioxide (TTD)

[Amount of pellets charged, 3.75 g.; Copolymer composition, 25% vinyl acetate; Reaction temperature, 80° C. Amount of $CH_3ONa$ catalyst, 2.5 mM. (140 mM./l.)]

| Experiment No. | Alcoholysis medium, of— | | | Hydrolyzed resin product | | | |
|---|---|---|---|---|---|---|---|
| | TTD | Toluene | Methanol | Reaction time, hrs. | Amount recovered, g. | Residual vinyl acetate, percent | Appearance and remarks |
| 3–1 | 0 | 0 | 17.8 | 3 | 3.35 | [1] 12.0 | Hazy pellets. |
| 3–2 | 0 | 1.7 | 16.1 | 3 | 3.40 | [2] 6.6 | Agglomerated pellets. |
| 3–3 | 0 | 8.1 | 10.4 | | | | Pellets dissolved. |
| 3–4 | 7.5 | 9.6 | 0.72 | 1 | 3.45 | [2] 10.8 | Light yellow pellets. |
| 3–5 | 7.5 | 9.6 | 0.72 | 2 | 3.47 | [2] 4.0 | Yellow pellets. |
| 3–6 | 7.5 | 9.6 | 0.72 | 3 | 3.38 | [2] 1.2 | Dark yellow pellets. |

[1] Infrared analysis in $CCl_4$ solution, calibration by saponification.
[2] Infrared analysis of compression-molded film, calibration by saponification.
[3] Saponification.

From a comparison of Experiments 3–4 to 3–6 with 3–1 it may be seen that the tetrahydrothiophene-1,1-dioxide/toluene/methanol medium provides essentially complete alcoholysis of the pellets in 2–3 hours, whereas the pellets are only about half-alcoholyzed in 3 hours in methanol alone.

The toluene-methanol medium known to the art is not practical for the alcoholysis at 80° C., since even small amounts of toluene (Exp. 3–2) cause agglomeration of the pellets without providing as extensive alcoholysis as the tetrahydrothiophene - 1,1 - dioxide/toluene/methanol medium of the present invention.

EXAMPLE 4

This example illustrates the solid phase alcoholysis of

TABLE 2.—SOLID PHASE ALCOHOLYSIS OF ETHYLENE-VINYL ACETATE COPOLYMER SHEETING

| Experiment No. | Sheet thickness, 20 mil copolymer vinyl acetate content, 25% (wt.) | | | | Duration of alcoholysis experiments, 15 min. | | |
|---|---|---|---|---|---|---|---|
| | Weight of film, g. | Toluene, ml. | Dimethylformamide, ml. | $NaOCH_3$, mM. | Methanol, ml. | Temp., °C. | Residual vinyl acetate, percent |
| 2–1 | 0.31 | 6.4 | 5.0 | 0.48 | 0.20 | 50 | 15.8 |
| 2–2 | 0.31 | 6.4 | 5.0 | 0.48 | 0.40 | 50 | 14.3 |
| 2–3 | 0.31 | 6.5 | 5.0 | 0.48 | 0.60 | 50 | 10.5 |
| 2–4 | 0.31 | 6.4 | 5.0 | 0.48 | 0.60 | 50 | 9.88 |
| 2–5 | 0.31 | 6.4 | 5.0 | 0.48 | 1.20 | 50 | 14.2 |
| 2–6 | 0.31 | 6.4 | 5.0 | 0.48 | 1.80 | 50 | 19.5 |
| 2–7 | 0.6 | 12.8 | 10.0 | 1.6 | 1.20 | 50 | 11.9 |
| 2–8 | 0.6 | 12.8 | 10.0 | 3.2 | 1.20 | 50 | 4.7±0.7 |
| 2–9 | 0.6 | 12.8 | 10.0 | 4.8 | 1.20 | 50 | 4.2±0.7 |
| 2–10 | 0.6 | 12.8 | 10.0 | 1.6 | 1.20 | 60 | 12.4 |
| 2–11 | 0.6 | 12.8 | 10.0 | 3.2 | 1.20 | 60 | 4.4±0.7 |
| 2–12 | 0.6 | 12.8 | 10.0 | 4.8 | 1.20 | 60 | 4.7±0.8 |

From Experiments 2–1 to 2–6 it may be seen that there is an optimum amount of methanol for maximum alcoholysis and that such is about 5% of the total medium, as in Experiments 2–3 and 2–4. When either more or less methanol is employed, the degree of alcoholysis is decreased. Regarding the amount of sodium methoxide to an ethylene-vinyl acetate copolymer powder in accordance with the process of this invention, wherein the medium taken for the alcoholysis comprises a mixture of N,N-dimethylformamide, toluene and methanol. The copolymer alcoholyzed contained about 19–20% by weight vinyl acetate and had been treated in accordance with the technique described in U.S. Pat. No. 3,422,049. The N,N-dimethylformamide used was dried before use by passage through activated molecular sievs and was shown by Karl Fischer analysis to contain 0.03% water.

The evidence of Example 2 shows that the level of methanol in the accelerated alcoholysis medium employed in the practice of this invention should be about 5% of the combined solvents in the medium. With this limitation, it was found empirically that agglomeration and dissolution of the copolymer powder were avoided by the use of media containing up to about 57% toluene; the balance of up to about 38% of the medium was dimethylformamide.

In the present example the toluene-dimethylfromamide-methanol mixture contained 54% toluene. The alcoholysis was carried out in a 50 ml., 3-necked glass reaction flask equipped with a mechanical stirrer, reflux condenser, liquid heating-bath, and inlet for nitrogen. The flask was flushed with nitrogen before starting and was maintained under a nitrogen atmosphere throughout the alcoholysis. Provision was also made for removing samples of the reaction mixture during the run to determine the degree of alcoholysis at desired elapsed time intervals.

To the reaction flask was added 30.0 ml. of the dimethylformamide and 38.4 ml. of toluene, followed by 2.88 ml. of a 3.5 M methanol solution of sodium methoxide (10 mM., 0.54 g.). To the resulting solution at room temperature was added at once 15.0 g. of the ethylene-vinyl acetate copolymer powder, and the suspension was immediately heated to reflux with stirring. The reaction was continued for 5.5 hours with stirring at reflux.

Small samples of the slurry were withdrawn at intervals by Pipet for analysis. Each sample was immediately washed with two 10 ml. portions of methanol, two 10 ml. portions of water, and one 10 ml. portion of methanol, and dried. The samples were analyzed for residual vinyl acetate by infrared spectroscopy.

Th very first samples (Table 4, 4–1 to 4–5) had to be taken before the reaction reached the operating temperature. Cooling was required to control the temperature in the early stages of the alcoholysis, which is distinctly isothermic. If the temperature rise is unchecked, agglomeration will result.

Examination of the data presented in the following Table 4 indicates that a very substantial degree of alcoholysis occurred after a reaction period as short as 15 seconds, with 8% residual vinyl acetate remaining unreacted in a copolymer which originally contained about 20%:

TABLE 4

Alcoholysis of an Ethylene-Vinyl Acetate Copolymer Powder in an N,N-dimethylformamide (DMF)-Toluene-Methanol Medium

[Copolymer composition, 20% vinyl acetate by weight. Charge: Copolymer powder, 15.00 g.; DMF, 30.0 ml.; Toluene, 38.4 ml.; 3.5 M NaOCH$_3$ in methanol$^3$, 2.88 ml. (10 mM., 0.54 g. NaOCH$_3$)]

| Sample No. | Time Sample taken | Reaction temperature, °C. | Vinyl acetate content of Sample, percent |
|---|---|---|---|
| 4–1 | 15 seconds | 38 | 8.1 |
| 4–2 | 30 seconds | 42 | 6.0±1.1 |
| 4–3 | 45 seconds | 45 | 6.0±1 |
| 4–4 | 60 seconds | 50 | 4.8±0.8 |
| 4–5 | 2 minutes | 55 | 4.2±0.6 |
| 4–6 | 5 minutes | 60 | 3.6±0.5 |
| 4–7 | 10 minutes | 60 | 3.3±0.4 |
| 4–8 | 30 minutes | 61 | 3.1±0.4 |
| 4–9 | 45 minutes | 62 | 2.9±0.4 |
| 4–10 | 1 hour | 60 | 2.6±0.4 |
| 4–11 | 2 hours | 61 | 2.3±0.4 |
| 4–12 | 3 hours | 61 | 1.7±0.6 |
| 4–13 | 6 hours | 60 | 1.2±0.7 |

EXAMPLE 5

This example illustrates the solid phase alcoholysis of the ethylene-vinyl acetate copolymer powder employed in Example 4, wherein the medium utilized for the alcoholysis comprised a mixture of dimethyl sulfoxide, toluene and methanol. The dimethylsulfoxide was dried before use by passage through activated molecular sieves in a nitrogen atmosphere. It was found to contain about 0.0220% of water by Karl Fischer analysis.

The alcoholysis was carried out in the apparatus and in the manner described in Example 4. The alcoholysis rate data obtained are summarized in Table 5:

TABLE 5

Alcoholysis of an Ethylene-Vinyl Acetate Copolymer Powder in a Dimethyl Sulfoxide-Toluene-Methanol Medium

[Copolymer composition; 20% Vinyl Acetate by Weight. Charge: Copolymer powder, 15.00 g.; Dimethyl sulfoxide, 30.0 ml., Toluene, 38.0 ml.; 5.2 M CH$_3$ONa methanol, 2.88 ml. (15 mM., 0.81 g. CH$_3$ONa)]

| Sample No. | Time Sample taken | Reaction temperature, °C. | Vinyl acetate content of Sample, percent |
|---|---|---|---|
| 5–1 | 15 seconds | 35 | 9.7 |
| 5–2 | 30 seconds | 40 | 9.6 |
| 5–3 | 45 seconds | 50 | 10.3 |
| 5–4 | 1 minute | 50 | 8.3 |
| 5–5 | 2 minutes | 55 | 6.1 |
| 5–6 | 5 minutes | 55 | 4.9±0.8 |
| 5–7 | 10 minutes | 61 | 4.7±0.8 |
| 5–8 | 15 minutes | 61 | 4.9±0.8 |
| 5–9 | 30 minutes | 61 | 4.2±0.6 |

CONTROL A

The solid phase alcoholysis of the ethylene-vinyl acetate copolymer of Examples 4 and 5 was repeated employing, however, methanol alone as the alcoholysis medium. The hydrolysis was carried out in the apparatus and employing the procedure set forth in Example 4, the degree of hydrolysis being regulated by the amount of sodium methoxide charged and by the reaction time.

The reaction was repeated three times using increasing amounts of sodium methoxide. The data presented in Table 6 show that, despite the small particle size of the copolymer, the alcoholysis was exceedingly slow in methanol at reflux. For example, about 20 mM. (1 g.) of sodium methoxide was required to effect the substantially complete alcoholysis (2–3% residual vinyl acetate content) of 7.5 g. of copolymer powder in 3 hours or more (Control A–2). Although essentially complete alcoholysis of 7.5 g. of copolymer powder could be achieved in as short a time as 15 minutes, 80 mM. (4.3 g.) of sodium methoxide was required therefor (Control A–4).

TABLE 6 (CONTROL A)

Alcoholysis of an Ethylene-Vinyl Acetate Copolymer Powder in Methanol effect of Sodium Methoxide Concentration on Rate of Alcoholysis

[Initial copolymer composition, 19–20% by weight of vinyl acetate; Amount of copolymer charged, 7.5 g.; Reaction temperature, Reflux (63° C.); Methanol, 35 ml.]

| Control | NaOCH$_3$, mM | Reaction time, hours | Residual vinyl acetate in product, percent |
|---|---|---|---|
| A–1 | 5.0 | 2 | 21.1 |
|  |  | 3 | 18.0 |
|  |  | 5.5 | 12.0 |
| A–2 | 19.6 | 1 | 5.6+1 |
|  |  | 3 | 3.2±0.4 |
|  |  | 4 | 2.8+0.4 |
|  |  | 5.5 | 2.7±0.4 |
| A–3 | 46 | 0.25 | 5.3±0.9 |
| A–4 | 80 | 0.25 | 1.1±0.8 |

It is clear that in a methanol medium, even a very finely divided copolymer powder is alcoholyzed at rates so slow that uneconomical amounts of sodium methoxide catalyst must be used or else the reaction must be extended over undesirably long reaction periods.

CONTROL B

The alcoholysis of the particulate ethylene-vinyl acetate reacted in Examples 4 and 5 and Control A above was repeated, utilizing as the alcoholysis medium a mixture of methanol and toluene, the latter being added to promote swelling of the solid polymer, thereby increasing the rate of alcoholysis.

The alcoholysis was carried out in the apparatus and in the manner described in Example 4. Prior to the experiments it was found empirically that at the temperature of the experiments (60–62° C.), the toluene-methanol alcoholysis medium should not contain more than about 40% (v./v.) of toluene; when media richer in toluene were used, coagulation and eventual dissolution of the powder took place.

In the experiments summarized in Table 7 the medium contained 37.5% toluene. Both the methanol and the toluene used were freshly dried under nitrogen by passage through activated molecular sieves over a period of about 4 hours. The water content of the dried solvents was established by Karl Fischer analysis to be 0.21% (methanol) and 0.0025% (toluene). These solvents were stored under nitrogen in closed flasks and handled with hypodermic syringes.

TABLE 7 (CONTROL B)

Alcoholysis of an Ethylene-Vinyl Acetate Copolymer Powder in Toluene Methanol Medium

[Initial copolymer composition, 20% by weight of vinyl acetate; Amount of copolymer charged, 7.5 g.; Reaction temperature, reflux (60–62° C.); Alcoholysis medium, 12.8 ml. toluene and 21.4 ml. methanol; NaOCH$_3$ catalyst used, 5 mM. (0.27 g.)]

| Sample No. | Time Sampled, hours | Residual vinyl acetate in Sample, percent |
|---|---|---|
| B-1 | 0.5 | 14.6 |
| B-2 | 1 | 13.0 |
| B-3 | 3.5 | 5.5±0.9 |
| B-4 | 4.5 | 3.2±0.4 |
| B-5 | 5 | 2.8±0.4 |

Inspection of the data summarized in Table 1 shows that, in a medium substantially as rich in toluene as possible without agglomeration of the powder particles, the copolymer approaches complete hydrolysis (5 mM. NaOCH$_3$, 7.5 g. copolymer powder) only after about a 5 hour reaction time (Sample No. B-5). It is evident that the alcoholysis is faster in this medium than it is in methanol alone, since under comparable conditions the alcoholysis is only about half complete in 5.5 hours in methanol (Control A-1, Table 6). Comparison of Sample B-4, Table 7, with Control A-2, Table 6, indicates that about 4 times more sodium methoxide is required for substantially complete alcoholysis in methanol than in toluene-methanol.

If the data of Tables 4 and 7 are compared graphically, it will be observed that a 4% residual vinyl acetate content may be obtained in 2 minutes employing the N,N-dimethylformamide-toluene-methanol medium of Example 4, whereas 4 hours was required to obtain the same degree of alcoholysis utilizing the toluene-methanol medium of Control B. In other words, the alcoholysis obtained in the accelerated alcoholysis medium employed in the practice of the invention was about 120 times more rapid than achieved employing the best toluene-methanol solvent medium of the control.

Further, when the data obtained in Example 5 and Control B are compared it will be seen that, although about 50% more sodium methoxide was used in the example than in the Control, the copolymer product can be alcoholyzed in the dimethyl sulfoxide-toluene-methanol medium of the invention to a residual vinyl acetate content of 5% at a rate approximately 44-fold that of the toluene-methanol medium of the Control.

EXAMPLE 6

This example illustrates the solid phase alcoholysis of a 4-mil commercial film made from an ethylene-vinyl acetate copolymer containing about 19–20% vinyl acetate, wherein the rapid rates of alcoholysis which can be attained by an accelerated alcoholysis medium of the present invention were compared with the much poorer rates which are obtained when the alcoholysis medium comprises toluene-methanol mixtures known to the art.

Each alcoholysis reaction was carried out in a stoppered side-arm test tube. The test tubes were flushed with N$_2$ before starting and a N$_2$ atmosphere was maintained throughout the alcoholysis via the side-arms. The methanol, toluene, and dimethylformamide had been dried under nitrogen before use and contained water as indicated in Example 4. The sodium methoxide catalyst solution (5.15 M) was made by dissolving a calculated amount of metallic sodium in methanol under N$_2$; from this solution appropriate volumes were withdrawn by hypodermic syringe and added to the test tubes, followed by the required toluene, and dimethylformamide (where used). The test tube was then placed in an oil bath held at the reaction temperature, and when reaction temperature had been reached, the film (0.60 g.), cut into pieces of convenient size for subsequent analysis, was added. Agitation was accomplished by frequent manual shaking.

At each selected elapsed time interval, a single piece of film was withdrawn with a forceps and immediately placed in cold methanol containing about 5% acetic acid, then washed twice with methanol, dried, and finally analyzed for residual vinyl acetate content by infrared procedures.

Table 8 compares the alcoholysis rates of the film in the dimethylformamide-toluene-methanol medium of this invention with those obtained for the toluene-methanol media of the art:

TABLE 8

Comparison of Rates of Alcoholysis of a 4-Mil Ethylene-Vinyl Acetate Copolymer Film in Dimethylformamide (DMF)-Toluene-Methanol with Rates in Toluene-Methanol Media

[Copolymer Composition, 19–20% vinyl acetate by weight; Alcoholysis temperature, 60° C.; Film charged per experiment, 0.600 g.; Sodium methoxide charged per experiment, 6.14 mM. (0.33 g.)[1]]

| Experiment No. | Alcoholysis medium | | | Alcoholyzed film Sample | | | |
|---|---|---|---|---|---|---|---|
| | DMF, ml. | Toluene, ml. | Methanol, ml. | Sample No. | Time taken | Vinyl acetate content, percent | Remarks |
| I | 10.0 | 12.8 | 1.20 | 6-1 | 15 seconds | 14.8 | Clear tough film; no agglomeration. |
| | | | | 6-2 | 30 seconds | 9.2 | Do. |
| | | | | 6-3 | 40 seconds | 7.2 | Do. |
| | | | | 6-4 | 50 seconds | 4.9±0.8 | Do. |
| | | | | 6-5 | 1 minute | 1.8±0.6 | Do. |
| II | None | 12.8 | 10.0 | 6-6 | 2 minutes | 21.4 | Film softens; agglomerates. |
| | | | | 6-7 | 5 minutes | 9.6 | Do. |
| | | | | 6-8 | 15 minutes | 8.4 | Do. |
| | | | | 6-9 | 20 minutes | 5.3±0.9 | Do. |
| | | | | 6-10 | 30 minutes | 3.2±0.4 | Do. |
| | | | | 6-11 | 45 minutes | 2.6±0.4 | Do. |
| | | | | 6-12 | 1 hour | 1.1±0.8 | Do. |
| | | | | 6-13 | 2 hours | 0.8±0.8 | Do. |
| III | None | 9.0 | 13.8 | 6-14 | 2 minutes | 18.5 | Soft film; very slight agglomeration. |
| | | | | 6-15 | 5 minutes | 17.9 | Do. |
| | | | | 6-16 | 15 minutes | 15.1 | Do. |
| | | | | 6-17 | 30 minutes | 9.8 | Do. |
| | | | | 6-18 | 40 minutes | 9.3 | Do. |
| | | | | 6-19 | 50 minutes | 5.8±1.1 | Do. |
| | | | | 6-20 | 1 hour | 4.8±0.8 | Do. |
| | | | | 6-21 | 2 hours | 2.0±0.5 | Do. |

[1] Added in the methanol as 5.15 M solution.

Inspection of the data of Table 8 reveals that in the dimethylformamide-toluene-methanol accelerated alcoholysis medium of the invention, the film is alcoholyzed in 1 minute from the original 19–20% vinyl acetate content to about 2% by weight of vinyl acetate (Exp. I, Sample 6–5), a degree of alcoholysis which required about 2 hours in the toluene-methanol medium of Exp. III (Sample 6–21). In other words, the alcoholysis reaction is about 120 times as fast in the accelerated alcoholysis medium of this invention as it is in the toluene-methanol medium exemplified in Experiment III. In Experiment II of this example (Table 8) the same degree of alcoholysis (about 2% residual vinyl acetate) is evidently reached in about 50 minutes when a toluene-rich toluene-methanol alcoholysis medium is employed (Sample 6–11); in other words the accelerated alcoholysis medium provides rates which are only about 50 times as fast in this instance.

It should be noted that the toluene-methanol medium of Experiment II is really too rich in toluene for a good solid phase alcoholysis; the film samples soften seriously and agglomerate or stick to each other. Film being alcoholyzed in this medium would be weak and would tear and break if tension were applied, as would be necessary in an in-line continuous film alcoholysis operation. This difficulty can only be overcome by employing a leaner toluene medium, more like that of Experiment III, which would lead to slower rates of alcoholysis. By contrast, the film specimens undergoing alcoholysis in the dimethylformamide-toluene-methanol medium of Experiment I are strong and show no disposition to agglomerate during alcoholysis.

It will be understood that various changes may be made in the specific parameters of the preferred embodiments of the accelerated solid phase alcoholysis process described hereinabove without departing from the scope of the present invention. Accordingly, it is intended that the preceding description should be construed as illustrative and not in a limiting sense.

We claim:

1. In a process for the solid phase alcoholysis of an ethylene-vinyl ester interpolymer in a reaction medium containing a low-boiling alcohol and an alkaline or acidic catalyst, the improvement comprising maintaining the reaction medium substantially free of water and incorporating an aprotic dipolar solvent therein, said aprotic dipolar solvent being selected from the group consisting of dimethylformamide, dimethylacetamide; a sulfoxide having the formula

wherein R and $R_1$ are each alkyl groups of from 1 to 4 carbon atoms; a sulfone of the formula

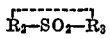

wherein $R_2$ and $R_3$ are each alkyl groups of from 1 to 4 carbon atoms, or are linked together to define a tetrahydrothiophene ring; N-methylpyrrolidone; hexamethylphosphoric triamide, tetramethylurea and acetonitrile.

2. The process of claim 1, wherein the reaction medium additionally includes a hydrocarbon solvent.

3. The process of claim 2, wherein the hydrocarbon solvent is a linear or branched paraffin, a cycloaliphatic hydrocarbon, or an aromatic hydrocarbon; the low-boiling alcohol is a monohydric alcohol having from one to four carbon atoms; and the catalyst is an alkali metal or alkaline earth metal alkoxide whose alkanolic moiety corresponds to that of said low-boiling alcohol, or an alkali metal or alkaline earth metal hydroxide.

4. The process of claim 1, wherein the ethylene-vinyl ester interpolymer contains from 1 to 25 mole percent of the vinyl ester and up to 5 weight percent of a monomer interpolymerizable with the ethylene and the vinyl ester, and wherein the interpolymer is alcoholyzed in the form of film, sheeting, strands, powder or pellets thereof.

5. The process of claim 1, wherein the ethylene-vinyl ester interpolymer: catalyst weight ratio varies from 1,000:1 to 1:1, the weight ratio of the interpolymer to the total reaction medium varies from 10:1 to 1:1,000, and the volumetric ratio of the interpolymer to the dipolar aprotic solvent varies from 1:1,000 to 100:1.

6. The process of claim 5, wherein the reaction medium additionally includes a hydrocarbon solvent, and wherein the volumetric ratio of the dipolar aprotic solvent plus the hydrocarbon solvent to the low-boiling alcohol varies from 100:1 to 1:4, and the volumetric ratio of the dipolar aprotic solvent to the hydrocarbon solvent varies from 100:1 to 1:10.

7. In a process for the solid phase alcoholysis of an ethylene-vinyl acetate copolymer containing from 3 to 50 weight percent vinyl acetate in a reaction medium incorporating a low-boiling alcohol, a hydrocarbon solvent and an alkaline or acidic catalyst, the improvement comprising including an aprotic dipolar solvent in the reaction medium in an amount such that the weight ratio of the copolymer to the aprotic dipolar solvent varies from 1:1,000 to 100:1, said aprotic solvent being selected from the group consisting of dimethylformamide, dimethylacetamide; a sulfoxide having the formula

wherein R and $R_1$ are each alkyl groups of from 1 to 4 carbon atoms; a sulfone of the formula

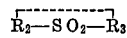

wherein $R_2$ and $R_3$ are each alkyl group of from 1 to 4 carbon atoms, or are linked together to define a tetrahydrothiophene ring; N-methylpyrrolidone; hexamethylphosphoric triamide, tetramethylurea and acetonitrile; maintaining the reaction medium substantially free of water; and carrying out the alcoholysis reaction under a dry, inert atmosphere.

8. The process of claim 7, wherein the several ingredients are incorporated in the reaction medium in the proportions specified below:

copolymer to catalyst—1,000:1 to 1:1 by weight;
copolymer to total reaction medium 10:1 to 1:1,000 by weight
dipolar aprotic solvent plus hydrocarbon solvent to low-boiling alcohol—100:1 to 1:4 by volume
dipolar aprotic solvent to hydrocarbon solvent—100:1 to 1:10 by volume

References Cited

UNITED STATES PATENTS

| | | | |
|---|---|---|---|
| 3,510,463 | 5/1970 | Bristol | 260—87.3 |
| 3,080,350 | 3/1963 | Imal et al. | 260—89.1 |
| 3,547,858 | 12/1970 | Worrall | 260—87.3 |
| 3,494,908 | 2/1970 | Hayes | 260—89.1 |

OTHER REFERENCES

Vinson, J. Chem., ed. 46, 877 (1969).

A. J. Parker, Quart. Rev. (London) 16, No. 2, 163, 176–77, 181 (1962).

Briston, Def. Pub. of Ser. No. 841,605, filed July 14, 1969, published in 8680.G.729 on Nov. 18, 1969, classified in class 260, sub. 87.3.

JOSEPH L. SCHOFER, Primary Examiner

J. KIGHT III, Assistant Examiner